US009657688B2

(12) United States Patent
Lutz et al.

(10) Patent No.: US 9,657,688 B2
(45) Date of Patent: May 23, 2017

(54) ASSEMBLY COMPRISING A HEAT ENGINE AND AN ELECTRIC COMPRESSOR

(71) Applicant: Valeo Systèmes de Contrôle Moteur, Cergy St Christophe (FR)

(72) Inventors: Philippe Lutz, Le Vesinet (FR); Sébastien Potteau, Triel sur Seine (FR); Aurélien Ramseyer, Boulogne-Billancourt (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 66 days.

(21) Appl. No.: 14/406,756

(22) PCT Filed: Jun. 6, 2013

(86) PCT No.: PCT/FR2013/051294
§ 371 (c)(1),
(2) Date: Dec. 10, 2014

(87) PCT Pub. No.: WO2013/186464
PCT Pub. Date: Dec. 19, 2013

(65) Prior Publication Data
US 2015/0176536 A1    Jun. 25, 2015

(30) Foreign Application Priority Data

Jun. 11, 2012    (FR) ...................................... 12 55415

(51) Int. Cl.
*F02B 37/00*    (2006.01)
*F02M 25/07*    (2006.01)
(Continued)

(52) U.S. Cl.
CPC ......... *F02M 25/0706* (2013.01); *F02B 47/08* (2013.01); *F02D 21/08* (2013.01);
(Continued)

(58) Field of Classification Search
CPC .... F02M 25/0706; F02M 26/07; F02M 26/04; F02M 29/02; F02M 26/34; F02M 26/10;
(Continued)

(56) References Cited

U.S. PATENT DOCUMENTS 6,062,026 A * 5/2000 Woollenweber ........ F02B 37/04
60/605.2
6,435,166 B1   8/2002 Sato et al.
(Continued)

FOREIGN PATENT DOCUMENTS

EP    1 041 289 A2    10/2000
EP    1 493 907 A2    1/2005
(Continued)

OTHER PUBLICATIONS

International Search Report for corresponding International Application No. PCT/FR2013/051294, mailed Aug. 8, 2013 (3 pages).

*Primary Examiner* — Hai Huynh
(74) *Attorney, Agent, or Firm* — Osha Liang LLP

(57) ABSTRACT

The invention relates to an assembly (1) comprising: an admission circuit (4) extending between an air inlet (11) and an outlet connected to the inlet of a heat engine (2); an exhaust circuit (6) extending between an inlet connected to the outlet of the heat engine (2) and an exhaust gas outlet (13); said heat engine (2); a return loop (22) enabling all or some of the exhaust gases in the exhaust circuit (6) to be reinjected upstream of the heat engine (2); and an electric compressor (30) arranged in the assembly (1) in such a way as to be able to receive gases recirculating in the return loop (22).

11 Claims, 2 Drawing Sheets

Figure 1:
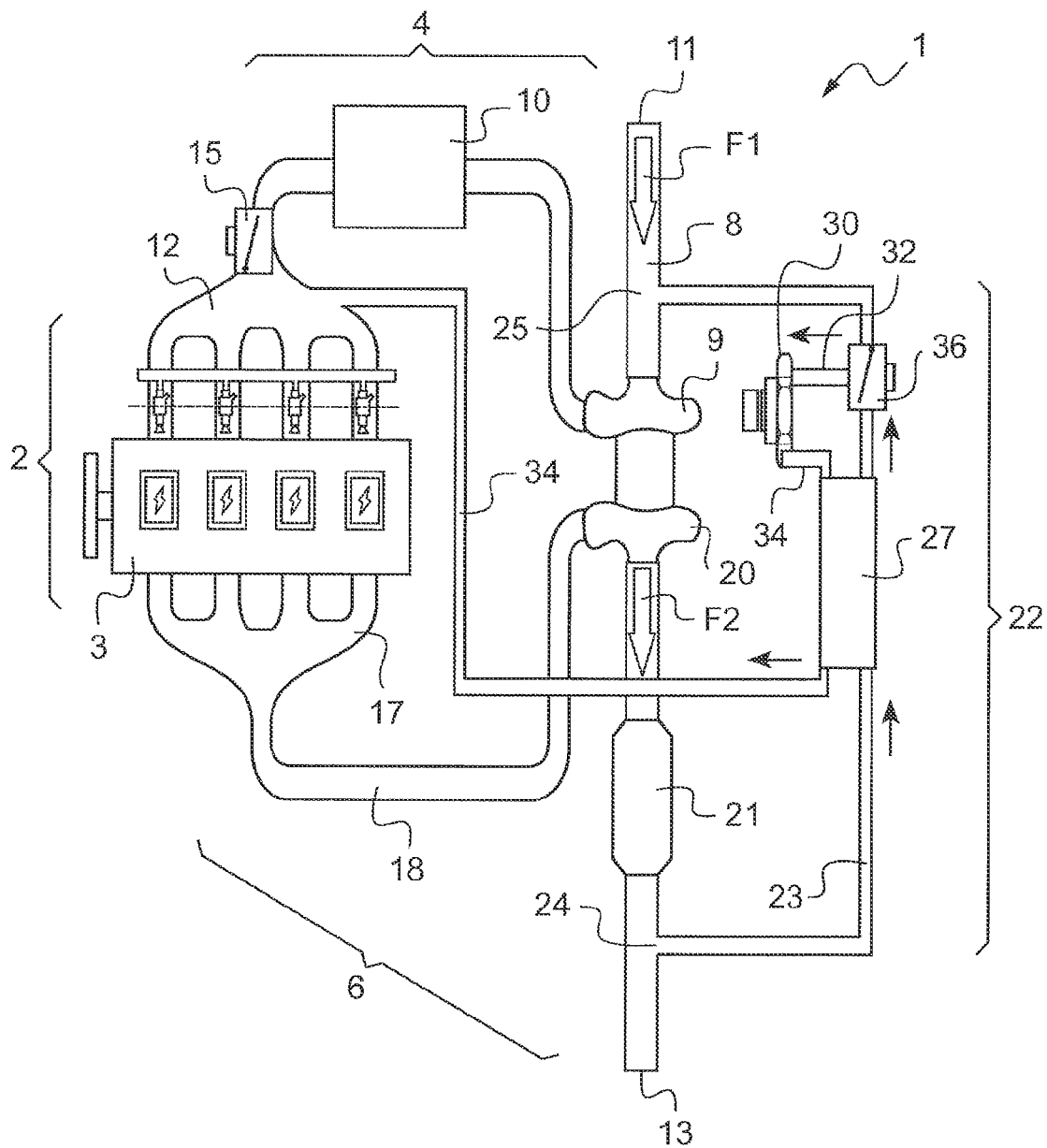

(51) Int. Cl.

| | |
|---|---|
| *F02B 47/08* | (2006.01) |
| *F02D 21/08* | (2006.01) |
| *F02M 26/04* | (2016.01) |
| *F02M 26/07* | (2016.01) |
| *F02M 26/06* | (2016.01) |
| *F02M 26/10* | (2016.01) |
| *F02M 26/34* | (2016.01) |
| *F02D 41/00* | (2006.01) |
| *F02B 37/04* | (2006.01) |
| *F02B 39/10* | (2006.01) |
| *F02M 26/71* | (2016.01) |

(52) U.S. Cl.
CPC ............ *F02M 26/04* (2016.02); *F02M 26/06* (2016.02); *F02M 26/07* (2016.02); *F02M 26/10* (2016.02); *F02M 26/34* (2016.02); *F02B 37/04* (2013.01); *F02B 39/10* (2013.01); *F02D 41/005* (2013.01); *F02D 2200/602* (2013.01); *F02M 26/71* (2016.02); *Y02T 10/121* (2013.01)

(58) Field of Classification Search
CPC .......... F02B 47/08; F02B 37/04; F02B 39/10; F02D 21/08; F02D 41/005; F02D 2200/602
USPC .. 123/568.16, 568.17, 565, 590, 592, 559.1; 60/605.2, 607, 608
See application file for complete search history.

(56) References Cited

U.S. PATENT DOCUMENTS

| | | | |
|---|---|---|---|
| 6,722,129 B2* | 4/2004 | Criddle | F01M 13/022 123/562 |
| 6,820,599 B2* | 11/2004 | Kurtz | F02B 1/12 123/568.21 |
| 6,945,236 B2* | 9/2005 | Nakai | F02B 31/085 123/568.12 |
| 7,168,250 B2* | 1/2007 | Wei | F02B 37/013 123/568.12 |
| 7,451,597 B2* | 11/2008 | Kojima | F02B 29/0418 60/605.1 |
| 8,196,404 B2* | 6/2012 | Onishi | F02D 41/0065 123/198 DB |
| 8,794,219 B2* | 8/2014 | Yasui | F02D 41/005 123/568.11 |
| 2005/0081835 A1 | 4/2005 | Larson et al. | |
| 2010/0146968 A1 | 6/2010 | Simpson et al. | |
| 2011/0094486 A1 | 4/2011 | Vuk | |

FOREIGN PATENT DOCUMENTS

| | | |
|---|---|---|
| EP | 1 870 590 A1 | 12/2007 |
| WO | 99/15773 A1 | 4/1999 |
| WO | 2010/149566 A1 | 12/2010 |

\* cited by examiner

ASSEMBLY COMPRISING A HEAT ENGINE AND AN ELECTRIC COMPRESSOR

The subject of the invention is an assembly comprising a heat engine and an electric compressor, and the control of this assembly, notably during a transient phase. This assembly may be carried on-board a vehicle.

Within the meaning of the invention, a transient phase is a phase during which the engine torque setpoint increases, as opposed to a steady-state phase during which the setpoint is constant.

It is known practice within a vehicle to use an assembly comprising an intake circuit extending between an air inlet and an outlet connected to the inlet of a heat engine, a heat engine, an exhaust circuit extending between an inlet connected to the outlet of the heat engine and an exhaust gas outlet, and a return loop allowing all or some of the exhaust gases in the exhaust circuit to be reinjected upstream of the heat engine.

The return loop is commonly located in such a way that its inlet in the exhaust circuit is downstream of a turbine and that its outlet in the intake circuit is upstream of a mechanical compressor placed in the intake circuit. Because of this layout, the return loop is referred to as an LP (for "low pressure") return loop.

Throughout the application, the terms "upstream" and "downstream" are defined with respect to the direction in which the gases circulate through the assembly.

An assembly with such an LP return loop offers numerous advantages because it allows the engine to be assured a level of gases recirculating through the return loop (more commonly referred to as a level of EGR) that is satisfactory throughout the operating range of the engine, notably at low speed and high load.

Nevertheless, such an LP return loop does have disadvantages in terms of the length of the path to be followed by the gases recirculating through this return loop and of metering the proportions of the gases originating from the inlet of the intake circuit, also referred to hereinafter as "fresh air", and the gases that have recirculated in the return loop. These disadvantages are not very well suited to operation in transient phase at high load and to a phase following the opening of a valve located in the return loop in order to cause gases to recirculate through said loop.

The use of a return loop of which the inlet in the exhaust circuit is upstream of the turbine and of which the outlet in the intake circuit is downstream of the mechanical compressor, also referred to as an HP (for "high pressure") return loop, makes it possible to reduce the length of the path that the gases recirculating through this loop have to follow, but presents other disadvantages.

There is a need to enjoy the benefits of an assembly that allows satisfactory recirculation of exhaust gases in the heat engine, even during transient phases, such as phases of acceleration under load or phases during which exhaust gases are recirculated in the return loop of the assembly.

It is an object of the invention to meet this need and the invention achieves this, according to one of the aspects thereof, using an assembly comprising:
- an intake circuit extending between an air inlet and an outlet connected to the inlet of a heat engine,
- an exhaust circuit extending between an inlet connected to the outlet of the heat engine and an exhaust gas outlet, said heat engine,
- a return loop allowing all or some of the exhaust gases in the exhaust circuit to be reinjected upstream of the heat engine, and
- an electric compressor, the electric compressor being located in the assembly in such a way as to be able to receive gases recirculating through the return loop.

The electric compressor allows all or some of the gases recirculating through the return loop to be compressed. When the electric compressor is in operation, it may also accelerate the path of the exhaust gases through the return loop by aspirating these gases. The electric compressor may thus make it possible to improve the proportion of gases (or EGR) recirculated through the heat engine in the transient phase by reducing the time taken to transfer these gases from the outlet of the engine until they are reinjected into the latter.

Thanks to the proportion of EGR obtained right from the start of the transient phase, the engine can be protected against knocking/pinging while at the same time dynamically ensuring desired performance.

The assembly obtained is moreover relatively compact.

The electric compressor is, for example, driven by an electric motor that has a nominal power of between 2 and 5 kW, or even as much as 50 kW.

The electric motor that drives the electric compressor may be a variable-reluctance motor.

The heat engine may be an internal combustion heat engine. It is, for example, a gasoline engine or a diesel engine. As an alternative, it may be a multi-fuel engine. The engine may run on alternative fuels (ethanol, LPG, NGV gas).

The intake circuit may comprise a mechanical compressor and the exhaust circuit may comprise a turbine, the return loop having an inlet in the exhaust circuit downstream of the turbine and an outlet in the intake circuit upstream of the mechanical compressor. The return loop is then an LP return loop, as explained hereinabove.

Outside of transient phases, the mechanical compressor may be used to compress the gases recirculating in the return loop and/or the gases originating from the inlet of the intake circuit and encourage the circulation of the EGR gases by the aspiration effect created by its operation.

The mechanical compressor may be connected to the turbine and driven thereby, the mechanical compressor and the turbine then forming a turbocharger. As an alternative, the mechanical compressor may be driven by the heat engine, notably via a belt.

The return loop may comprise an air or water heat exchanger for cooling the exhaust gases before mixing them with the fresh air and before reinjecting them into the heat engine.

According to a first embodiment of the invention, the electric compressor is positioned outside of the return loop, having an inlet connected to the return loop by an inlet pipe starting in the return loop. According to this first embodiment, the compressor may have its outlet connected to the inlet of the engine by an outlet pipe.

According to this first embodiment, the electric compressor may be located neither in the intake circuit nor in the return loop, such that the inlet pipe and the outlet pipe form an additional path allowing the gases in the return loop upstream of the inlet pipe to reach the heat engine.

The outlet pipe opens for example directly into the intake manifold admitting gases to the combustion chamber of the heat engine. In this way, since the EGR gases are reinjected into the heat engine without following the intake circuit, these gases do not disturb the fresh air circulating in the intake circuit. As a result, the flow rate of the fresh air in the mechanical compressor may be optimal.

The additional path formed by the inlet pipe, the electric compressor and the outlet pipe may behave like an HP return loop such that the assembly according to this first embodiment has an LP return loop and a pseudo HP return loop.

The inlet pipe connecting the return loop to the inlet of the electric compressor may start downstream of the heat exchanger.

The outlet pipe may comprise a portion circulating through the heat exchanger.

According to this first embodiment, the recirculation of the gases via the electric compressor may thus be accompanied by two successive coolings of these gases, allowing these gases to have an appropriate temperature when reinjected into the engine.

The assembly may, according to the first embodiment, comprise a system of valves which is configured to direct gases recirculating in the return loop from the exhaust circuit toward the inlet pipe of the electric compressor or toward the intake circuit.

According to one configuration of the system of valves, all of the gases recirculating in the return loop may be directed toward the electric compressor.

According to another configuration of the system of valves, all of the gases recirculating in the return loop may be directed toward the intake circuit, i.e. the electric compressor is not fed with EGR gas.

A configuration in which a portion of the gases recirculating in the return loop is directed toward the intake circuit whereas the other portion of said gases is directed toward the electric compressor is possible. The ratio between the portion of gases directed toward the intake circuit and the portion of gases directed toward the electric compressor can vary over time, for example when switching from the transient phase to a steady-state phase, and vice-versa.

The system of valves comprises for example a valve located in the inlet pipe leading to the electric compressor and another valve located in the return loop downstream of the inlet pipe.

As an alternative, a three-way valve may be located in the return loop at the point at which the inlet pipe begins. One way may be formed by the portion of the return loop upstream of the inlet pipe, another way may be formed by the portion of the return loop downstream of the inlet pipe, while the final way of the three-way valve may be formed by the inlet pipe.

According to a second embodiment, the electric compressor may be located in the intake circuit, the return loop having a first outlet opening into the intake circuit upstream of the electric compressor and a second outlet opening into the intake circuit downstream of the electric compressor. The second outlet may open into the intake circuit upstream of the intake manifold admitting gases into the combustion chamber of the heat engine.

The first and second outlets of the return loop may be the only outlets of this return loop.

According to this second embodiment, the electric compressor may receive fresh air originating from the inlet of the intake circuit in addition to the gases recirculating through the return loop, or independently of these EGR gases. According to this second embodiment, the electric compressor thus has two inlets: a fresh air inlet and an EGR gas inlet.

The first and second outlet of the return loop may open into the intake circuit upstream of the mechanical compressor.

The electric compressor and the mechanical compressor may both be located in the intake circuit according to this second embodiment, the electric compressor being placed upstream of the mechanical compressor.

The intake circuit may comprise a bypass branch starting upstream of the electric compressor and opening downstream of the electric compressor. This bypass branch, or "bypass" as it is more usually called in English, may allow the fresh air entering the intake circuit to bypass the electric compressor.

According to this second embodiment, the assembly may comprise a system of valves which is configured to direct gases recirculating in the return loop toward the first or the second outlet of said loop.

Still according to this second embodiment, the system of valves may also be configured to direct gases originating from the inlet of the intake circuit into the bypass branch or toward the electric compressor.

According to one configuration of the system of valves, all of the gases recirculating in the return loop are directed toward the first outlet, so as to be fed to the electric compressor.

According to another configuration of the system of valves, all of the gases recirculating through the return loop are directed toward the second outlet, so that these gases do not pass through the electric compressor.

A configuration in which a portion of the gases recirculating in the return loop is directed toward the first outlet whereas the other portion of said gases is directed toward the second outlet is possible. The ratio between the portion of the gases directed toward the first outlet and the portion of these gases directed toward the second outlet can vary over time, for example when passing from the transient phase to a steady-state phase and vice-versa.

In each of the configurations hereinabove, the system of valves may allow all or some of the gases originating from the inlet of the intake circuit to circulate through the electric compressor or to bypass the latter using the bypass branch.

When the electric compressor receives both the gases recirculating in the return loop and the gases originating from the inlet of the intake circuit, a homogeneous mixture of fresh air and of EGR gases can be circulated rapidly in the intake circuit.

The system of valves may comprise a valve in the portion of the return loop adjacent to the first outlet, a valve in the portion of the return loop adjacent to the second outlet, a valve in the bypass branch and a valve in the intake circuit, downstream of the inlet of the bypass branch and directly at the inlet of the electric compressor.

As an alternative, a three-way valve may be provided in the return loop, one way corresponding to the first outlet, another way corresponding to the second outlet, while the other way corresponds to the portion of the return loop upstream of the branch between the first and second outlets.

There may also be a three-way valve at the branch between the bypass branch and the portion of the intake circuit opening into the inlet of the electric compressor. As an alternative, the portion of the intake circuit opening into the inlet of the electric compressor may be devoid of any valve.

In another of its aspects the invention also relates to an assembly comprising:
- an intake circuit extending between an air inlet and an outlet connected to the inlet of a heat engine,
- an exhaust circuit extending between an inlet connected to the outlet of the heat engine and an exhaust gas outlet, said heat engine, a return loop allowing all or some of the exhaust gases in the exhaust circuit to be reinjected upstream of the heat engine, and an electric compressor, the electric compressor being located in the assembly in such a way as to receive at least gas recirculating through the return loop and/or gas originating from the inlet of the intake circuit.

All or some of the above features apply to this other aspect of the invention.

According to another of its aspects, the invention also relates to a method of supplying an electric compressor incorporated into an assembly comprising:

an intake circuit extending between an air inlet and an outlet connected to the inlet of a heat engine, an exhaust circuit extending between an inlet connected to the outlet of the heat engine and an exhaust gas outlet, said heat engine, a return loop allowing all or some of the exhaust gases in the exhaust circuit to be reinjected upstream of the heat engine, and an electric compressor, in which method the electric compressor is fed with at least gas recirculating in the return loop and/or gas originating from the inlet of the intake circuit.

The assembly may be as mentioned hereinabove.

In another of its aspects another subject of the invention is a method for controlling an assembly as defined hereinabove, in which method, during a transient phase the electric compressor is activated and used to compress all or some of the gases recirculating in the return loop.

The electric compressor may also, or as an alternative, receive gases originating from the inlet of the intake circuit and the electric compressor may compress said gases.

The transient phase may correspond to an acceleration under load of the vehicle into which the assembly is incorporated or to the start of a recirculation of the exhaust gases in the return loop, for example.

The transient phase may be followed by a steady-state phase in which the assembly is controlled in such a way that the electric compressor is not supplied with gases recirculating in the return loop and/or with gases originating from the inlet of the air intake circuit.

The assembly may comprise a system of valves, notably as mentioned hereinabove, and during the transient phase the system of valves may be in a configuration such that the electric compressor receives:

according to the first embodiment, all of the gases recirculating in the return loop, and according to the second embodiment, all of the gases recirculating in the return loop and all of the fresh air originating from the inlet of the intake circuit.

When changing to the steady-state phase, the configuration of the system of valves may be modified so that:

according to the first embodiment, a still greater proportion of gases recirculating in the return loop does not circulate through the electric compressor but is reinjected upstream of the mechanical compressor, and according to the second embodiment, a still greater proportion of gases recirculating in the return loop circulates through the second outlet to open downstream of the electric compressor and upstream of the mechanical compressor and a still greater proportion of fresh air circulates through the bypass branch.

During the steady-state phase, the configuration of the system of valves may be such that:

according to the first embodiment, all of the gases recirculating in the return loop then circulate into the intake circuit and not into the electric compressor, and according to the second embodiment, all the gases recirculating in the return loop enter the intake circuit via the second inlet and all the gases originating from the inlet of the intake circuit circulate into the bypass branch.

According to the method, the assembly is equivalent in the steady-state phase to an assembly according to the prior art, having no electric compressor.

In the steady-state phase, the electric compressor can be deactivated.

According to the method, the electric compressor can be used during the turbocharger start-up phase and then deactivated once the turbocharger is operating suitably.

In all of the embodiments hereinabove, a catalytic converter may be provided in the exhaust circuit and the inlet of the return loop may be located downstream of this catalytic converter.

The invention may be better understood from reading the following description of some nonlimiting embodiments thereof and from studying the attached drawing in which:

FIG. 1 schematically depicts an assembly according to a first embodiment, and

Figure 2:
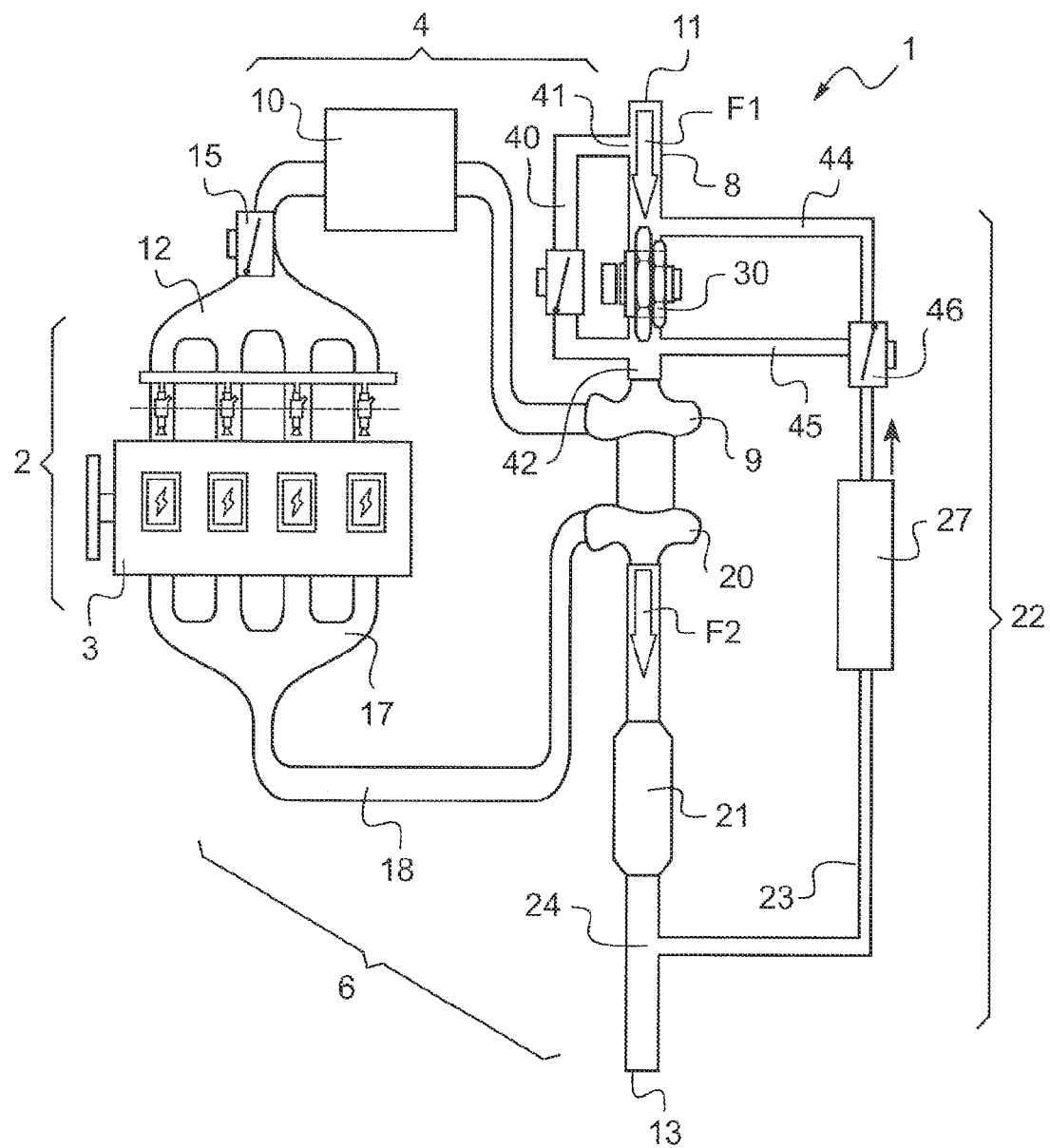

FIG. 2 schematically depicts an assembly according to a second embodiment.

FIG. 1 depicts an assembly 1 according to a first embodiment of the invention. This assembly 1 comprises a motor vehicle internal combustion heat engine 2. This engine 2 comprises a combustion chamber 3 comprising a plurality of cylinders, four of them in the example described, and is intended to receive a mixture of oxidant and of fuel. In the example described, the fuel is gasoline, but the invention is not restricted to such an example of fuel, likewise being applicable to the use of diesel oil as fuel, for example. The oxidant is, for example, pure air or an air/EGR mixture.

Combustion in the cylinders generates the work of the engine 2. The engine 2 operates in the conventional way: the gases are admitted to the combustion chamber 3, where they are compressed, burned and then expelled in the form of exhaust gases.

This engine 3 has an inlet connected to an intake circuit 4 in the engine 2 and an outlet connected to a gas exhaust circuit 6.

The inlet 11 of the intake circuit defines the inlet via which the fresh air enters the assembly 1, whereas the outlet 13 of the exhaust circuit 6 defines the outlet via which the exhaust gases are removed from the assembly 1.

The intake circuit 4 in the engine 2 comprises, in the example being considered, an intake duct 8 for the feed gases (the flow of which is represented by the arrow F1), a mechanical compressor 9 for the feed gases, which in this instance is a turbocharger, and a heat exchanger 10, allowing the gases originating from the mechanical compressor 9 to be cooled. This heat exchanger 10 is commonly referred to by those skilled in the art by its acronym "CAC" which stands for "charge air cooler"; this is because its purpose is to cool the intake gases and particularly the air, with which it is said to be supercharged, because the air is compressed. At the outlet of the CAC 5, the gases open into the inlet of the engine 2, which is formed of an intake manifold 12 admitting gases to the combustion chamber 3 of the engine 2. The manifold 12 thus forms an inlet box for letting gases into the cylinder head of the engine 2.

Upstream of the intake manifold 12 admitting the gases to the engine 2, the intake circuit 4 may comprise a valve 15 comprising a shutter of the butterfly type, the function of which is to regulate the rate of flow of gases in order to regulate the engine speed; this valve 15 is controlled by an engine control unit (typically referred to by its English-language acronym ECU which stands for engine control unit), well known to those skilled in the art.

The outlet from the engine 2 is formed by an exhaust gas manifold 17. The latter is connected to an exhaust gas tract or duct 18 forming part of the gas exhaust circuit 6. The exhaust circuit 6 also comprises a turbine 20 rotating as one with the mechanical compressor 9 of the intake gases and therewith forming a turbocharger. The turbine 20 is driven by the exhaust gases of the exhaust tract 18, the flow of which is indicated schematically by the arrow F2.

The assembly 1 further comprises a return loop 22 allowing all or some of the exhaust gases circulating through the exhaust circuit 6 to be reinjected into the engine 2. This return loop comprises a duct 23 guiding the exhaust gases reinjected into the engine 2. The return loop 22 has an inlet 24 in the exhaust circuit 6 and via which exhaust gases from the exhaust circuit 6 are tapped off before being removed at the outlet 13. The inlet 24 of the return loop 22 may be located near this outlet 13 and downstream of a catalytic converter 21 present in the exhaust circuit 6.

The return loop 22 in the example of FIG. 1 comprises an outlet 25 opening into the intake circuit 4 and via which exhaust gases are reinjected upstream of the engine 2. This outlet 25 in this instance is located upstream of the mechanical compressor 9. The return loop 22 in this example is an LP return loop.

The return loop 22 further comprises, in the example of FIG. 1, a water-cooled or air-cooled heat exchanger 27 for cooling the exhaust gases recirculating in the loop 22.

According to the embodiment of FIG. 1, the assembly further comprises an electric compressor 30. This compressor is driven by an electric motor, not depicted, control of which is, for example, had via the engine control unit.

According to the first embodiment, the electric compressor 30 is located outside of the return loop 22 and connected thereto by an inlet pipe 32. The inlet pipe 32 starts in the return loop 22 downstream of the heat exchanger 27 in the example of FIG. 1.

The electric compressor 30 is moreover connected to the intake manifold 12 by an outlet pipe 34 a portion of which is received in the heat exchanger 27.

According to this first embodiment, there is an additional recirculation path that allows the gases leaving the engine 2 to follow part of the loop 22, the inlet pipe 32, the electric compressor 30 and the outlet pipe 34 and be reinjected into the engine 2. Along this additional path, the gases pass through the heat exchanger 27 twice in succession.

The assembly 1 may, as depicted in FIG. 1, comprise a system of valves allowing all or some of the gases recirculating in the loop 22 upstream of the inlet pipe 32 to be directed selectively into said inlet pipe 32 or into the intake circuit 4. The system of valves in this example comprises a three-way valve 36 one way of which is formed by the portion of the return loop 22 upstream of the inlet pipe 32, another way of which is formed by the portion of the return loop 22 downstream of the inlet pipe 32, and the final way of which is formed by the inlet pipe 32.

The way in which the assembly 1 of FIG. 1 works will now be described. During a transient phase, the electric compressor 30 is activated and the three-way valve 36 is operated in such a way that the gases recirculating in the loop 22 are directed into the inlet pipe 32 and compressed by the electric compressor 30. These compressed gases are then reinjected by the outlet pipe 34 directly into the intake manifold 12 where they are mixed with the fresh air. This then ensures an optimal proportion of EGR in the engine 2. This configuration of the assembly 1 can be maintained for a few seconds.

The three-way valve 36 may then be operated in such a way as to cause the quantity of exhaust gases circulating in the inlet pipe 22 to diminish progressively and the quantity of such gases reinjected into the intake circuit 2 to increase accordingly.

Finally, the three-way valve 36 may adopt the configuration in which the return loop 22 is followed wholly by the exhaust gases, the electric compressor 30 then being deactivated. This then is, for example, a steady-state phase.

A second embodiment of the invention, which differs from that described with reference to FIG. 1 in terms of the position of the electric compressor 30, will now be described with reference to FIG. 2. In this example, the electric compressor 30 is located in the intake circuit 4 upstream of the mechanical compressor 9.

Still in this example, the intake circuit 4 comprises a bypass branch 40 the inlet 41 of which is situated upstream of the electric compressor 30 and the outlet 42 of which is situated downstream of the electric compressor 30 and upstream of the mechanical compressor 9. The bypass branch 40 thus allows the gases originating from the inlet of the intake circuit to bypass the electric compressor 30.

Still in FIG. 2, the return loop 22 comprises two distinct outlets 44 and 45.

The first outlet 44 opens into the intake circuit 4 upstream of the electric compressor 30 and downstream of the inlet 41 on the bypass pipe 40, while the second outlet 45 opens into the intake circuit 4 downstream of the electric compressor 30.

As depicted in FIG. 2, a system of valves may be provided. The system of valves in this example comprises a three-way valve 46 located in the return loop 22 at the branch between the first outlet 44 and the second outlet 45. One way is formed by the return loop 22 upstream of the branch while the other two ways are formed by each outlet 44 and 45.

The system of valves further comprises a valve 48 located in the bypass pipe 40.

In this example, no additional path connecting the return loop 22 to the inlet of the engine 2 exists.

The system of valves can be operated in such a way that the electric compressor 30 receives:
both gases recirculating in the return loop 22 and gases originating from the inlet 11 of the intake circuit 4,
only gases recirculating in the return loop 22,
only gases originating from the inlet 11 of the intake circuit 4.

One example of how the assembly 1 of FIG. 2 works during a high-load transient phase will now be described.

The three-way valve 46 and the valve 48 can then be operated in such a way that all the gases recirculating in the loop 22 and all the fresh air are directed toward the electric compressor 30 and compressed thereby. So doing encourages rapid circulation through the intake circuit 4 of a homogeneous mixture of fresh air and EGR gas.

When this transient phase ends, the valve 48 can be closed progressively and the configuration of the three-way valve 46 can be modified progressively until the fresh air circulates only through the bypass pipe 40 and the EGR gases circulate only in the second outlet 45. During the steady-state phase, the electric compressor 30 is therefore shortcircuited. The assembly 1 therefore behaves like an assembly that has no electric compressor 30 and that has an LP return loop.

The invention is not restricted to the examples that have just been described.

The expression "comprising a" is to be understood to be synonymous with the expression "comprising at least one" unless specified otherwise.

The invention claimed is:

1. An assembly comprising:
   an intake circuit extending between an air inlet and an outlet connected to the inlet of a heat engine, wherein the intake circuit comprises a mechanical compressor;
   an exhaust circuit extending between an inlet connected to the outlet of the heat engine and an exhaust gas outlet, wherein the exhaust circuit comprises a turbine;
   said heat engine;
   a return loop allowing all or some of the exhaust gases in the exhaust circuit to be reinjected upstream of the heat engine, and
   an electric compressor, the electric compressor being located in the assembly so as to be able to receive gases recirculating through the return loop, the electric compressor being located in the intake circuit,
   the return loop having:
      a first outlet opening into the intake circuit upstream of the electric compressor,
      a second outlet opening into the intake circuit downstream of the electric compressor and upstream of the manifold admitting gases into the combustion chamber of the heat engine, and
      an inlet downstream of the turbine and corresponding outlets upstream of the mechanical compressor.

2. The assembly as claimed in claim 1, the first and second outlets of the return loop being the only outlets of this return loop.

3. The assembly as claimed in claim 1, the intake circuit comprising a bypass branch starting upstream of the electric compressor and opening downstream of the electric compressor.

4. The assembly as claimed in claim 3, the system of valves also being configured to direct gases originating from the inlet of the intake circuit into the bypass branch or into the electric compressor.

5. The assembly as claimed in claim 1, comprising a system of valves which is configured to direct gases recirculating in the return loop toward the first or the second outlet of said loop.

6. A method for controlling an assembly, the assembly comprising:
   an intake circuit extending between an air inlet and an outlet connected to the inlet of a heat engine;
   an exhaust circuit extending between an inlet connected to the outlet of the heat engine and an exhaust gas outlet;
   said heat engine;
   a return loop allowing at least a portion of the exhaust gases in the exhaust circuit to be reinjected upstream of the heat engine, and
   an electric compressor, the electric compressor being located in the assembly so as to be able to receive gases recirculating through the return loop, the electric compressor being located in the intake circuit,
   the return loop having:
      a first outlet opening into the intake circuit upstream of the electric compressor, and
      a second outlet opening into the intake circuit downstream of the electric compressor and upstream of the manifold admitting gases into the combustion chamber of the heat engine,
   wherein the method comprises:
      during a transient phase, activating the electric compressor and using the electric compressor to compress at least a portion of the gases recirculating in the return loop.

7. The method as claimed in claim 6, wherein the electric compressor also receives gases originating from the inlet of the intake circuit, and wherein the electric compressor compresses said gases also.

8. The method as claimed in claim 6, wherein the transient phase is followed by a steady-state phase in which the assembly is controlled in such a way that the electric compressor is not supplied with gases recirculating in the return loop or with gases originating from the inlet of the air intake circuit.

9. The method as claimed in claim 8, wherein the electric compressor is deactivated during the steady-state phase.

10. The method as claimed in claim 6, wherein the electric compressor is driven by a variable-reluctance motor.

11. An assembly comprising:
    an intake circuit extending between an air inlet and an outlet connected to the inlet of a heat engine, wherein the intake circuit further comprises a mechanical compressor;
    an exhaust circuit extending between an inlet connected to the outlet of the heat engine and an exhaust gas outlet, wherein the exhaust circuit further comprises a turbine;
    said heat engine;
    a return loop allowing all or some of the exhaust gases in the exhaust circuit to be reinjected upstream of the heat engine, and
    an electric compressor, the electric compressor being located in the assembly so as to be able to receive gases recirculating through the return loop, the electric compressor being located in the intake circuit, wherein the electric compressor is configured to activate during a transient phase and compress at least a portion of the gases recirculating in the return loop,
    the return loop having:
       a first outlet opening into the intake circuit upstream of the electric compressor,
       a second outlet opening into the intake circuit downstream of the electric compressor and upstream of the manifold admitting gases into the combustion chamber of the heat engine, and
       an inlet downstream of the turbine and its outlets upstream of the mechanical compressor.

* * * * *